(12) United States Patent
Kordun et al.

(10) Patent No.: US 7,865,544 B2
(45) Date of Patent: Jan. 4, 2011

(54) METHOD AND SYSTEM FOR PROVIDING XML-BASED ASYNCHRONOUS AND INTERACTIVE FEEDS FOR WEB APPLICATIONS

(75) Inventors: Alexander Kordun, Arlington, MA (US); Neil J. Schultz, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 11/768,371

(22) Filed: Jun. 26, 2007

(65) Prior Publication Data

US 2009/0006523 A1 Jan. 1, 2009

(51) Int. Cl.
G06F 15/16 (2006.01)
G06F 7/00 (2006.01)
G06F 17/30 (2006.01)

(52) U.S. Cl. .................. 709/200; 709/217; 709/219; 707/705

(58) Field of Classification Search ............ None
See application file for complete search history.

(56) References Cited

U.S. PATENT DOCUMENTS

| | | | |
|---|---|---|---|
| 6,865,599 B2 | 3/2005 | Zhang | |
| 7,581,166 B2* | 8/2009 | Renger et al. | 715/201 |
| 2004/0041843 A1 | 3/2004 | Cui et al. | |
| 2004/0230536 A1 | 11/2004 | Fung et al. | |
| 2005/0198305 A1 | 9/2005 | Pezaris et al. | |
| 2005/0261909 A1 | 11/2005 | Sienel et al. | |
| 2005/0289468 A1* | 12/2005 | Kahn et al. | 715/738 |
| 2006/0167981 A1 | 7/2006 | Bansod et al. | |
| 2006/0253489 A1 | 11/2006 | Kahn et al. | |
| 2006/0265662 A1 | 11/2006 | Gertzen | |
| 2007/0022174 A1 | 1/2007 | Issa | |
| 2007/0043766 A1* | 2/2007 | Nicholas et al. | 707/104.1 |
| 2007/0055748 A1 | 3/2007 | Kim et al. | |

OTHER PUBLICATIONS

Jack D. Herrington, "The Ajax transport method", IBM Corporation, 1994, pp. 1-28.
Hideki Hiura, "xfy Delivers Web2.0 and Beyond" JavaOne Conference, Session TS-8401, 2006, pp. 1-21.
"Ajax", pp. 1-24. author unknown.

* cited by examiner

*Primary Examiner*—John B. Walsh
(74) *Attorney, Agent, or Firm*—David A. Dagg

(57) ABSTRACT

A system for providing XML-based asynchronous and interactive feeds for Web applications that provides a highly efficient and extensible XML Javascript framework allowing easy insertion of a comment/news feed control into any Web page. The framework allows for reading of any XML format and provides a new and easy way for modifying the look-and-feel of the control via HTML templates with familiar XPath bindings. The rendering performed through the system supports both flat and indented ("threaded") views for a comment thread. The system improves the parsing speed of incoming XML, and supports a flexible event model for others to develop plug-ins and mashups in the spirit of Web 2.0.

18 Claims, 10 Drawing Sheets

BBC UK News feed (RSS)

Alexander Kordun - 9 Mar

RSS fee from BBC UK News

Edit | Delete

*Previous | Next*

- Abbas appoints new Palestinian PM
  Palestinian leader Mahmoud Abbas names a new prime minister, a day after dissolving the Hamas-led government.
  Fri, 15 Jun 2007  14:26:34 GMT
- Indonesia 'holds militant leader'
  Indonesian police say they have captured the head of the Islamist group blamed for the 2002 bali bombs.
  Fri, 15 Jun 2007  11:06:51 GMT
- Huge Swiss tunnel opens in Alps
  Switzerland opens the world's longest rail tunnel on land-the 34km Loetschberg tunnel under the Alps.
  Fri, 15 Jun 2007  10:05:16 GMT
- 'Children die' in Afghan bombing
  At least six children and three adult civilians die in a suicide attack on a Nato convoy in the Afghan province of Uruzgan, police say.
  Fri, 15 Jun 2007  15:01:59 GMT
- Three dead in Sardinia rail crash
  Two trains have collided on the Italian Island of Sardinia, killing at least three people, including one Briton and injuring seven others.
  Fri, 15 Jun 2007  12:04:52 GMT

*FIG. 2*

```
302 — <link href="styles/threadStyles.css" rel="stylesheet" type="text/css" media="all"/>    // CSS used for templates
304 — <script language="JavaScript" src="javascript/roninHelper.js"></script>    // "Ronin" is the name of the framework. This is in
                                                                                 //    an include of the helper javascript library.
306 — <script language="JavaScript" src="javascript/roninService.js"></script>    // This is include of the main javascript library with
                                                                                  //    the logic of the framework
308 — <div id="feedEntriesContainer" style="display: block;">
        <div class="feedEntriesPaging">    //This DIV provides (optional) paging controls for our thread
          <ul class="inlinelist">
            <li class="first"><a href="#" id="paginatePrevious" onClick="javascript:feed_thread.pagePrev();">Previous</a></li>
            <li><a href="#" id="paginateNext" onClick="javascript:feed_thread.pageNext();">Next</a> </li>
          </ul>
        </div>
        <div id="feedEntriesList1" class="feedEntriesList"></div>    //This is the DIV where the comments will be inserted once loaded
      </div>
```

*FIG. 8*

```
<script type="text/javascript">
    var config = {                                                                    //Feed thread configuration object
312──   targetURL        : 'http://news.google.com/?output=atom',    //XML feed to use for the data. In this case it is an ATOM feed
314──   interval         : 5,                                         //Paging size. Paging is local in the browser for optimal performance
316──   proxyPrefixURL   : 'xmlProxy',                                //The name of the XML proxy since this HTML page is not in the
                                                                      //   "news.google.com" domain where the data resides
318──   containerId      : 'feedEntriesList1',                        //The name of the DIV where the feed contents will go
320──   layout           : 'FLAT',                                    //The layout type. Also, an INDENTED view is supported.
322──   postTemplateMap: { 'rss': 'RSSTextTemplate.jsp', 'atom': 'ATOMTextTemplate.jsp'} //The control supports automatic feed-type detection.
                                                                      //   Here we map certain feed types to defined HTML templates.
    };
324──  var feed_thread = new Thread(config);                          // The thread object is instantiated with the above configuration
       feed_thread.loadThread();                                      // LoadThread function called to load and display the Thread
</script>
```

FIG. 9

METHOD AND SYSTEM FOR PROVIDING XML-BASED ASYNCHRONOUS AND INTERACTIVE FEEDS FOR WEB APPLICATIONS

FIELD OF THE INVENTION

The present invention relates generally to World Wide Web technologies, and more specifically to a method and system for providing XML-based asynchronous and interactive feeds for Web applications.

BACKGROUND OF THE INVENTION

As it is generally known, many new Web application technologies provided on the Internet today are referred to as "Web 2.0". These technologies include a second generation of Web-based communities and hosted services (e.g. social-networking sites, wikis, folksonomies, etc.), and are intended to facilitate collaboration and sharing between users. Applications in this area usually include simple to use user interfaces, and typically share some important technical attributes. For example, Web 2.0 applications often expose an XML (eXtensible Mark-up Language)-based "REST" ("Representational State Transfer") API (Application Programming Interface) for invoking Web services over HTTP (HyperText Transfer Protocol), and have the ability to interact with the server asynchronously via AJAX (Asynchronous Javascript and XML).

In addition, there are an increasing number of Web sites that expose their data in XML formats such as the traditional RSS (Really Simple Syndication) format and/or the more recent Atom format. These publishing formats let users view headlines of the latest updates from their favorite blogs and Web sites all from within a single newsreader program. Such XML-based formats, also referred to as "feeds," "news feeds" or "Web feeds," typically include headlines, short descriptions, and links to articles. Existing systems allow reading of data provided through these publishing formats, as well as updating the via the aforementioned REST APIs.

Some of the most sought after features of Web sites today that can leverage such technologies are Comment feed controls, Discussion Thread functionality, and/or news feed aggregations that allow users to read and add data from various datasources or engage in discussions right on the current HTML page. In the past, Web site developers had to implement the user interface for these features separately for each Web site, and could not rely on a standard protocol to send/read information over HTTP. Furthermore, existing feed controls are clumsy, requiring frequent page refreshes resulting in high amounts of network traffic, and are too specific to be reused in multiple Web sites or Web applications exposing different data types.

One existing system provided by JS-Kit.com (http://js-kit.com) includes a toolkit inserted into the Web page via Javascript include, and allows for AJAX-style commenting that reduces page refreshes. However, this framework lacks configurable XML support, does not offer an event model, offers no configurability, and does not provide an easy way to modify look-and-feel via I/O bindings to an HTML template, thus making it useful only for very trivial commenting applications.

Some existing feed readers allow users to read nicely-rendered feeds in their Web pages. Some examples include Google Reader, Rojo, Gritwire, News Alloy, Pluck Web Edition, Bloglines, FeedLounge, Attensa Online, and Newsgator Online. These feed readers present feed data nicely on the page, but are all very limited in that the do not support arbitrary feed types (only RSS and ATOM), and do not offer an easy way to customize the look-and-feel of the feed thread. Another problem with such existing "online feed reader" systems is that they are not easily included in Web pages or configurable with a flexible event model for other "mashups" to integrate with. These systems also do not offer efficient XML parsing.

Some XML Javascript frameworks allow users to build applications, e.g. the Spry technology provided by Adobe. An RSS feed reader built with this framework is available at: http://labs.adobe.com/technologies/spry/demos/rssreader/index.html. The main disadvantage of this framework is that it does not offer an HTML template binding approach using standard XPath for look-and-feel customization of the thread. This system also doesn't have effective optimization for fast XML parsing, and requires users to learn a separate declarative language in order to use the framework, beyond knowledge of HTML and XML.

Conventional gadget frameworks like Google, Microsoft and Yahoo Gadgets offer limited support in this area, but the tools they offer are severely limited. While such systems may allow for simple downloading of XML content, they do not offer convenient customization techniques or performance improvements. These systems also generally require a specific XML gadget format to be included in Web pages. There are also significant limitations in making POST requests to update data using these frameworks. Instead, it would be desirable to have a system that is independent of any specific gadget framework, and that can be included into any page very easily.

SUMMARY OF THE INVENTION

In order to address the above described and other shortcomings of previous approaches, a new method and system for providing XML-based asynchronous and interactive feeds for Web applications. The disclosed system provides a highly efficient and extensible XML Javascript framework that allows for easy insertion of a XML feed control into any Web page. The disclosed framework allows for reading of feed data in any XML format, and provides a new and easy way for modifying the layout of each entry in the feed data via HTML templates with XPath bindings. For example, the rendering performed through the disclosed system can support both flat and indented ("threaded") views for a comment thread. The disclosed system further improves the parsing speed of incoming XML, and supports a flexible event model for other services to operate with to provide "mashups" (hybrid applications) in the spirit of Web 2.0.

The disclosed system includes a Javascript library, a set of predefined HTML templates, and optionally an XMLHTTP server-side proxy servlet to route POST and GET requests to different domains from the Web browser. These components are installed as a Web application on a server system. As a result, Web pages on the client system can include and configure the disclosed XML feed control by referencing the Javascript library and CSS (Cascading Style Sheets), and can configure the control in Javascript against a particular XML data source. When the HTML for the Web page loads, the Web browser asynchronously contacts the XML data source, downloads the XML feed payload, and renders it on the Web page according to an appropriate HTML template bindings and look-and-feel. Other Web applications can easily insert more features into the resulting feed thread by taking advantage of events provided at multiple points in the processing performed by the control. The user can also interact with the XML feed, for example by posting comments back to the server. All server interactions are asynchronous to page loads for faster usability. If requests are going against a server in a different domain, a proxy servlet can easily be used to meet Javascript security limitations.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a simplified screen shot showing an example of a user interface provided by an illustrative embodiment of the disclosed system;

FIG. 8 shows a code segment present within a parent HTML Web page in an illustrative embodiment;

FIG. 9 shows a code segment operable to perform configuration for at least one XML feed display in an illustrative embodiment.

DETAILED DESCRIPTION OF EXEMPLARY EMBODIMENTS

Figure 1:
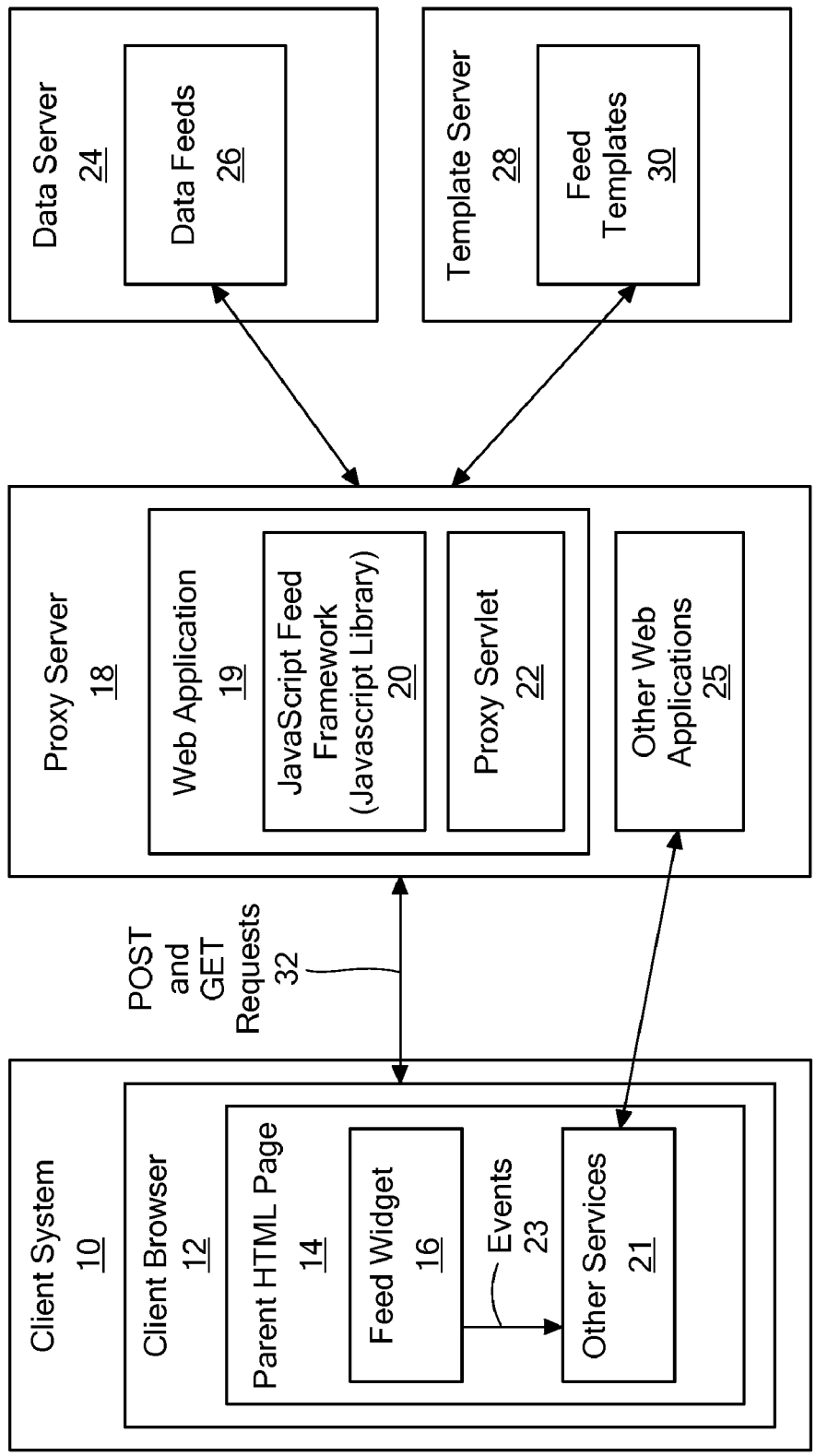
FIG. 1 is a block diagram of software and/or hardware components in an illustrative embodiment of the disclosed system.

FIG. 1 is a block diagram of software and/or hardware components in an illustrative embodiment of the disclosed system. As shown in FIG. 1, a Client System 10 includes a Client Browser 12 in which is loaded a Parent HTML Page 14 that includes a Feed Widget 16. The Feed Widget 16 is an example of a client-side aspect of the disclosed system operable to provide a user interface display of an XML feed. During operation of the Feed Widget 16, Events 23 are generated (e.g. by the Client Browser in response to actions performed by the Feed Widget 16), and these events may be recognized and processed by Other Services 21. The Events 23 allow the Other Services 21 to access data collected and processed by the Feed Widget 16, in order to provide additional aspects of a user interface display of an XML feed received and formatted through the Feed Widget 16.

The Client Browser 12 operates to render the Parent HTML Page 14, including the display of the XML feed associated with the Feed Widget 16, to a local user of the Client System 10 as part of a graphical user interface provided by the Client System 10 through a display device, such as an LCD (Liquid Crystal Display), LED (Light Emitting Diode), CRT (Cathode Ray Tube), or the like. The Client System 10 may be embodied as any specific type of electronic device operable to provide a graphical user interface to a user, including but not limited to a desktop computer system, laptop, notebook or other type of portable computer system, personal digital assistant (PDA), cell phone, or any combination thereof. The Client Browser 12 may be embodied by any specific type of technology operable to process HTML and/or other Web page related script and/or other content, such as a Web Browser or other application program software or firmware executing on the Client System 10, hardware circuitry such as one or more Application Specific Integrated Circuits (ASICs), Field Programmable Gate Arrays (FPGAs), discrete logic circuits, and/or combinations of such software, firmware and/or hardware components.

A Proxy Server 18 is shown including a Web Application 19 that includes a Javascript Feed Framework 20 and a Proxy Servlet 22. The Proxy Server 18 further includes Other Web Applications 25 that operate in cooperation with the Other Services 21 that respond to the Events 23. As further shown in FIG. 1, a Data Server 24 includes Data Feeds 26, and a Template Server 28 includes Feed Templates 30. The server systems 18, 24 and 28 may be embodied as any specific type of electronic device operable to execute the Web Application 19, and provide the Data Feeds 26 and Feed Templates 30. Such systems include, but are not limited to, computer server systems and the like. Moreover, while the servers 18, 24 and 28 are shown as separate systems in the illustrative embodiment of FIG. 1, the disclosed system is not limited to such an embodiment. Accordingly, the Web Application 19, Other Web Applications 25, Data Feeds 26, and/or Feed Templates 30 may alternatively be provided using a single server system, or some other specific number of server systems, as appropriate for the embodiment and/or configuration.

During operation of the illustrative embodiment of FIG. 1, HTTP POST and GET Requests 32 are generated by the Client Browser 12 in response to the Parent HTML Page 14 and the Feed Widget 16 contained within the Parent HTML Page 14, and passed to the Proxy Server 18. The Javascript Feed Framework 20 is an example of a Javascript library as used in an embodiment of the disclosed system. The Feed Templates 30 are an example of a set of predefined HTML templates as used in an embodiment of the disclosed system. Also, the Proxy Servlet 22 is an example of an XMLHTTP server-side proxy servlet operable to route the HTTP POST and GET Requests 32 to different domains from the Client Browser 32. As shown in FIG. 1, these components may be installed as part of the Web Application 19 on one or more server systems. As a result, different Web pages (e.g. Parent HTML Page 14 and others) can include and configure the disclosed XML feed control (e.g. Feed Widget 16) by simply referencing the appropriate Javascript library from the Javascript Feed Framework 20, as well as CSS (Cascading Style Sheets) that are either part of the Parent HTML Page 14 or an appropriate one of the Feed Templates 30. The disclosed XML feed control can accordingly be configured in Javascript against a particular XML data source (e.g. from the Data Feeds 26). When the HTML for the Parent HTML Page 14 loads, the Client Browser 12 asynchronously contacts the XML data source (e.g. from Data Feeds 26), downloads the XML feed payload, and renders it within the displayed Parent HTML as further described below. Other Web applications 21 can easily insert more data and user interface objects into the resulting feed thread user interface display by taking advantage of the flexible event model also further described below. The local user of Client System 10 can also interact with the feed thread (e.g. in the case where the XML feed is a Comments thread), by posting data back to the server (e.g. Data Server 24). All server interactions are asynchronous with respect to HTML pages loads for faster usability. Accordingly, the Parent HTML Page 14 can stay loaded in the Client Browser 12 while the XML feed is displayed by the Feed Widget 16, without having to perform a new page load.

If, as illustrated in FIG. 1, HTTP POST and GET Requests 32 are directed to a server in a different domain (e.g. Data Server 24 and/or Template Server 28), the Proxy Servlet 22 is used to route the requests and associated responses in order to meet Javascript security limitations.

Using the disclosed system, a Web page author can quickly and conveniently construct a "parent" Web page (e.g. Parent HTML Page 14 of FIG. 1) containing an instance of the disclosed XML feed control (e.g. Feed Widget 16). For example, the Feed Widget 16 included by the author of Parent HTML Page 14 within Parent HTML Page 14, in order to read an XML news publication feed (e.g. in either RSS or ATOM format), and output the contents of the XML feed to the local user of the Client System 10 within the graphical user interface of the Client System 10. The Web page author constructs the parent Web page such that there's a section where the XML feed will be displayed, shown for purposes of illustration by section 23 in the screen shot 21 of FIG. 2. As shown in the example of FIG. 2, section 23 contains a +/−button 25 that the local user can click on to trigger loading and display XML feed by the Feed Widget 16 within an initially empty/hidden section 26. The Web page author also includes a Javascript configuration (e.g. code segment of FIG. 9) of the Feed Widget 16 that is invisible to the local user within the parent Web page. Accordingly, when the parent Web page is rendered on the Client System 10, the local user clicks on the +/−button 25, which causes the Feed Widget 16 to become active (e.g. a "loadThread( )" function is called). The Feed Widget 16 then starts to operate in one of the sequences shown in FIGS. 3 and 4 and further described below. Once the feed HTML template and the XML feed data are downloaded from the server(s), the Feed Widget 16 applies the template to the data, and the data is displayed in section 26, as shown in FIG. 2. The display in section 26 is the result of the Feed Widget 16 having executed and displayed the result. The received HTML template describes the appearance and layout of a single entry in the thread of entries shown in section 26, such as the row 28. Accordingly, when the feed template is applied to the entire set of received XML feed data, section 26 includes one row per data item, e.g. one row per XML feed entry. In the example of FIG. 2, each row is an entry from the corresponding news feed, including a link to a complete article (e.g. link 27 for row 28), a summary for the article (e.g. summary 29 for row 28), and publication date and time information for the article (e.g. date and time 31 for row 28).

Also shown in FIG. 2 is a paging control 25. When the disclosed system displays the received XML feed data, the complete set of necessary feed data to create the user interface display is downloaded and cached on the Client Browser 12, so that paging actions do not require a server round trip. The paging control 25 is an optional feature of the disclosed system, and may or may not be included in a given embodiment.

Those skilled in the art will recognize that the screen shot 21 of FIG. 2 shows only one illustrative embodiment of the disclosed system, and that many other alternative embodiments are possible. In particular, those skilled in the art will recognize that the Feed Widget 16 can be activated in a variety of specific ways, including through a button such as the button 25 of FIG. 2, through some other user interface construct, in response to loading of the Parent HTML page 14 into the Client Browser 12, or in some other way. The Feed Widget 16 may accordingly be considered a configurable black box to the Web page author that wants to include some kind of XML feed on a Web page. Moreover, while the disclosed XML feed control can be embodied as an on-line news feed reader as illustrated in FIG. 2, it can alternatively be embodied as an interactive visualization of a comment/discussion thread as further described below. In such an alternative comment/discussion thread embodiment, the system is "interactive", since it further supports posting back user data to the server(s)—again using AJAX asynchronous methods without loading a new Web page into the Client Browser 12.

Advantageously, the disclosed system allows for flexible configuration of the disclosed XML feed control (e.g. Feed Widget 16), via HTML templates. This provides the ability to (a) configure the disclosed framework to any XML feed data source via appropriate bindings, and (b) accomplish any appearance and layout. The disclosed system may further provide for parsing optimizations that save network traffic, and is relatively easy to place on a Web page—since it does not require sophisticated Javascript or XML knowledge by the Web page author.

Figure 3:
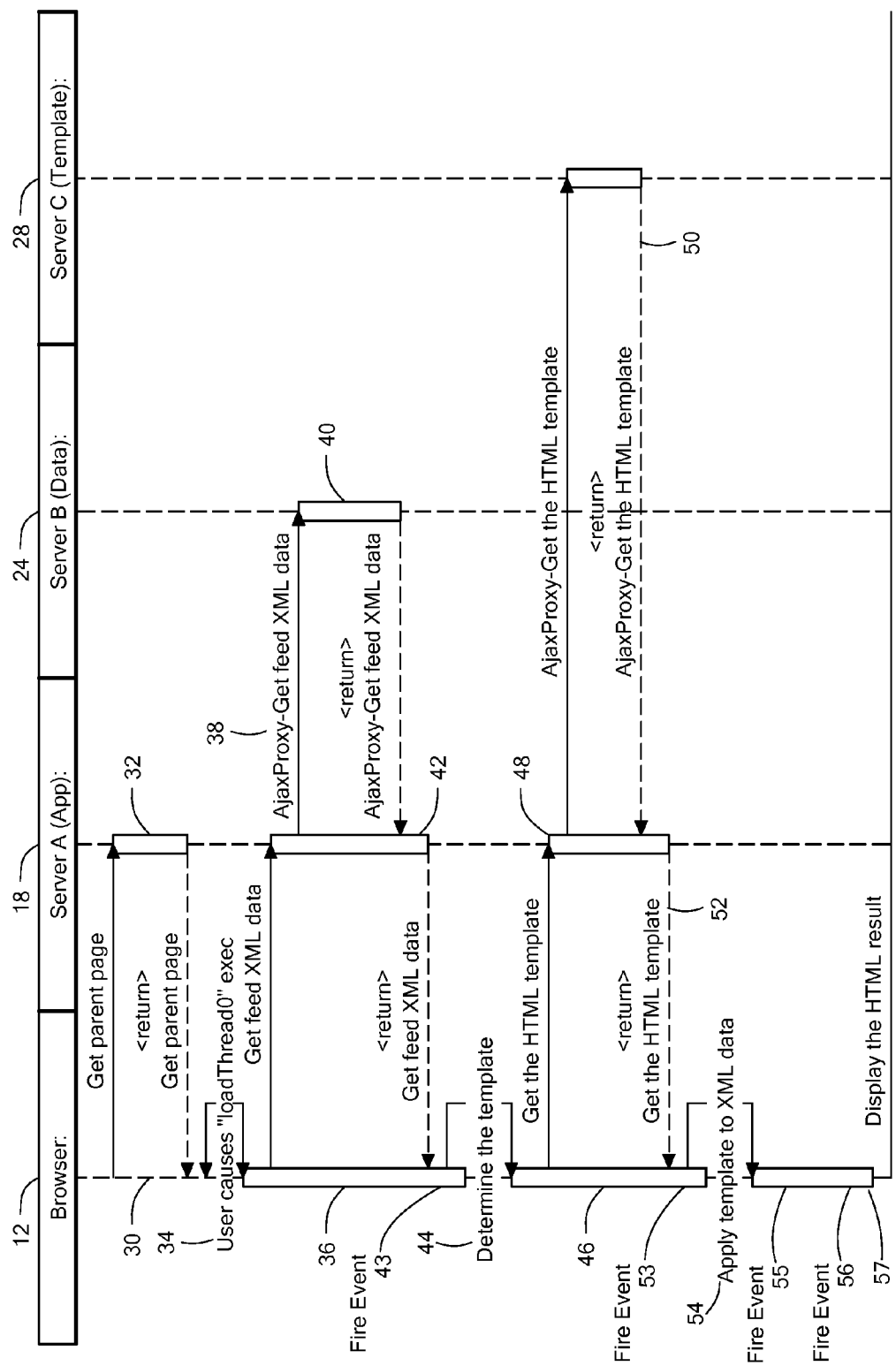
FIG. 3 is a sequence diagram showing steps performed during operation of a first illustrative embodiment of the disclosed system.
Figure 4:
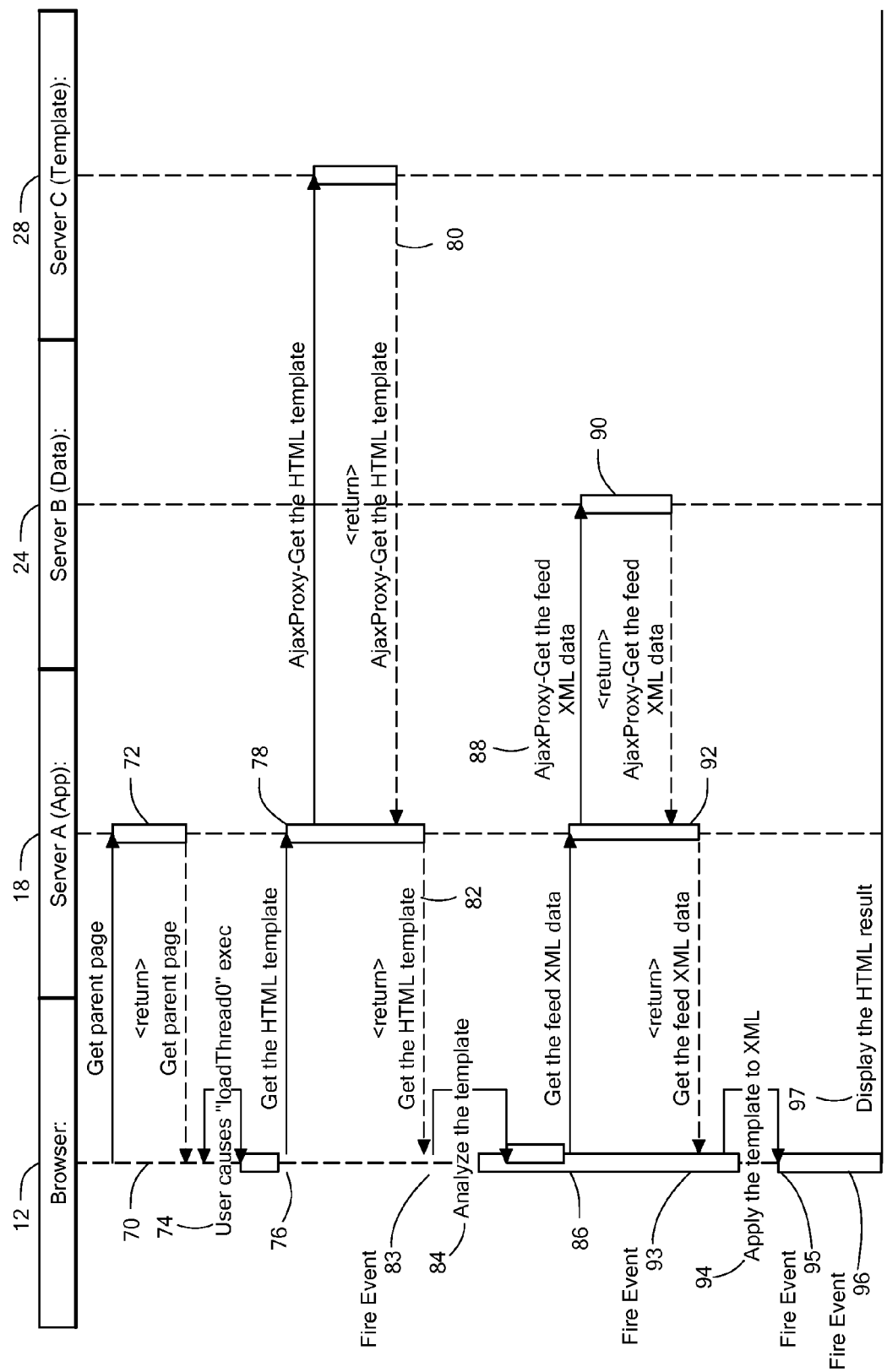
FIG. 4 is a sequence diagram showing steps performed during operation of a second illustrative embodiment of the disclosed system.

FIGS. 3 and 4 are sequence diagrams showing two operational examples of embodiments of the disclosed system. As will be evident upon the below description of FIGS. 3 and 4, the sequences differ in the order of template loading. The sequence diagrams of FIGS. 3 and 4 show HTTP requests. While the examples of FIGS. 3 and 4 are with regard to an embodiment in which multiple servers are operating in different domains, the present invention is not limited to such an embodiment. Accordingly, in alternative embodiments, a single server system can be used. For example if the Web Application 19, the Feed Templates 30, and the XML Data Feeds 26 reside on the same server, then the Proxy Servlet 22 (also referred to in FIGS. 3 and 4 as "AjaxProxy") is not needed, since all requests are to the same domain. The operation of the disclosed XML feed control is not dependent on a specific server topology because the Web page author can conveniently configure it within a Web page by specifying what URLs to use for its HTTP requests. Accordingly, if HTTP requests are going to different domains, for the disclosed XML feed control to work with the Client Browser 12's typical security constraints, the Proxy Servlet 22 is needed. Those skilled in the art will accordingly recognize that the disclosed system is therefore not limited to embodiments that include the Proxy Servlet 22 or the like. Moreover, the Web page author may in fact use a proxy server having any specific path or topology. It is the responsibility of the Web page author to specify correct and resolvable URLs for the Javascript configuration (see FIG. 9) of the disclosed XML feed control.

FIG. 3 is a sequence diagram showing steps performed during operation of a first illustrative embodiment of the disclosed system. As shown in FIG. 3, at step 30 the Client Browser 12 issues an HTTP GET request for the parent Web page, for example as a result of the local user performing an action (e.g. clicking on a link, pasting a URL into the Web browser navigation bar, etc.). At step 32, the Proxy Server 18 returns the parent Web page to the Client Browser 12, including the configuration Javascript (e.g. FIG. 9) and Javascript library (e.g. Javascript Feed Framework 20 of FIG. 1) used in the disclosed XML feed control.

At step 34, the local user of the Client System 10 causes a "loadThread( )" method from the downloaded Javascript library to execute (e.g. as a result of the user clicking on the +/−button 25 of FIG. 2). Next at step 36, the Client Browser 12 issues an HTTP GET request for the feed XML data, which is received by the Proxy Server 18. At step 38 the Proxy Server 18 issues an HTTP GET request to the Data Server 24 to obtain the feed XML data. The Data Server 24 then responds at step 40 by sending the feed XML data to the Proxy Server 18, which returns the feed XML data to the Client Browser 12 at step 42. At step 43 the Client Browser 12 fires an event indicating that XML feed data has been received to allow other applications registered for that event to access and process the received XML feed data.

The Client Browser 12 operates to determine the appropriate HTML template for formatting the received XML feed data at step 44, and then issues an HTTP GET request for that HTML template to the Proxy Server 18 at step 46. The Proxy Server 18 in turn forwards the HTTP GET request for the HTML template to the Template Server 28 at step 48, and the Template Server 28 responds to the Proxy Server 18 with the requested HTML template at step 50, which forwards the HTML template to the Client Browser 12 at step 52. At step 53 the Client Browser 12 fires an event indicating that the HTML template has been received to allow other applications registered for that event to access received HTML template.

At step 54 the Client Browser 12 applies the received template to each entry in the received XML data in order to prepare the complete set of received XML feed data for display based on the HTML template. After each entry or row of the XML feed data is formatted based on the HTML template, the Client Browser 12 causes the event 55 to be issued to any other applications that may have registered for that event, in order to allow those other applications to access the formatted feed entry prior to it being displayed in order to add any features or display objects to the display of that entry. Next, after all the entries have been formatted for display, but still before the XML feed data is displayed, at step 56 the Client Browser 12 fires another event indicating that all the XML feed data has been formatted based on the HTML template, in order to allow other applications registered for that event to add any features or display objects to the display of the complete formatted XML feed data prior to displaying it. Then at step 57 the HTML result of the all the preceding processing of the XML feed data is displayed to the local user of the Client System 10.

FIG. 4 is a sequence diagram showing steps performed during operation of a second illustrative embodiment of the disclosed system. As shown in FIG. 4, at step 70 the Client Browser 12 issues an HTTP GET request for the parent Web page, for example as a result of the local user performing an action (e.g. clicking on a link, pasting a URL into the Web browser navigation bar, etc.). At step 72 the Proxy Server 18 responds to the Client Browser 12 with the requested parent Web page, including the configuration Javascript (e.g. FIG. 9) and Javascript library (e.g. Javascript Feed Framework 20 of FIG. 1) used in the disclosed XML feed control.

At step 74 the local user of the Client System 10 causes the "loadThread( )" method to execute (e.g. as a result of the user clicking on the +/−button 25 of FIG. 2), and at step 76 the Client Browser 12 issues an HTTP GET request to get the appropriate HTML template. The template request of step 76 is received by the Proxy Server 18, and at step 78 the Proxy Server 18 forwards the template request to the Template Server 28, which responds with the requested HTML template at step 80. The Proxy Server 18 then forwards the HTML template to the Client Browser 12 at step 82. An event 83 is then fired allowing other applications that have registered for the event to learn that the HTML template for the XML feed has been loaded, and to access the template and do any desired processing based on the contents of the template. The Client Browser 12 analyzes the received template at step 84, including getting the binding fields from the template. If the template includes style attributes, then the analysis at step 84 would include unifying styles into a single style sheet to be applied to all entries of the XML feed, and potentially other optimization steps. The Client Browser 12 then issues an HTTP GET request at step 86 to obtain the feed XML data, and the Proxy Server 18 then in turn requests the feed XML data from the Data Server 24 at step 88. The Data Server 24 responds with the feed XML data 90 at step 90, and the Proxy Server 18 in turn returns the feed XML data to the Client Browser 12 at step 92. An event 93 is then fired allowing other applications that have registered for the event to learn that the XML data for the XML feed has been loaded, and to access the XML data and do any desired processing based on the contents of the received XML data.

The Client Browser 12 applies the received template to each entry in the feed XML data at step 94, in order to prepare the complete set of entries for display. As each entry is formatted based on the template, the event 95 is fired to any other applications that have registered for the event, in order to allow such other applications to add any services or display objects to each entry before it is displayed. Furthermore, after all the entries of the XML feed are formatted based on the template, but prior to displaying the XML feed data, another event 96 is fired to any other applications that have registered for the event, allowing such other applications to insert any services or display objects to the complete set of entries prior to them being displayed. Finally, at step 97 the HTML result of all the preceding steps is displayed to the local user of the Client System 10.

In an alternative embodiment to that shown in FIG. 4, the disclosed system may operate such that the template for displaying the XML feed data is first obtained, and then only specific fields are requested in XML feed data. Such an embodiment optimizes parsing and data transmission resource requirements. In this alternative embodiment, when the template is analyzed at step 84, the disclosed system may be embodied to offer flexible extensibility in retrieving the bindings from the template, and using them to let the server know what XML data is relevant in the following steps. This can be done in either of two ways:

1) The binding attributes which are XPath (XML Path Language) paths to the data that is needed are serialized into a string and appended to the GET request in step 86 (e.g. http:// . . . data.xml¶ms=entry/link@href,entry/author/name fd). The disclosed system does not rely on any specific way of encoding the XPath expressions onto the URL, and this can vary between embodiments. However, if filtering of feed data is done in this way, an agent on the server system (e.g. Proxy Servlet 22 in Proxy Server 18 if multiple domains are used) intercepts this request, reads the parameter, and on the response generated at step 92 only returns the data that has the XML elements specified in the GET request generated at step 86.

2) The binding attributes which are XPath paths to the data are serialized into a string, and the disclosed framework (e.g. Feed Widget 16) can then make one or more additional requests after step 86 to the server to communicate which elements are needed in the returned XML. This can be done by HTTP POST requests from the Client browser 12 indicating the desired data elements (instead of appending them to the URL as in option 1) above, which is limiting for long URLs), or by using further HTTP GET requests. This second option effectively lets the server know: "When I perform the GET for data at step 86, make sure to return only what I need." The disclosed system does not depend on or include any specific intermediary steps to selectively obtain a relevant subset of the XML feed data, and/or a specific technique for the Proxy Server 18 to get data filtering information. In an embodiment of the disclosed system performs filtering in this way, there is an agent (e.g. Proxy Servlet 22) on the server (e.g. Proxy Server 18) that receives such filtering information, and that operates responsively to return the feed data to the Client System 10 including only the indicated XML elements.

While the user interface example of FIG. 2 and description of the sequence diagrams in FIGS. 3 and 4 are with regard to an application of the disclosed system to on-line feed reading, other embodiments include use of the disclosed system for online Comments/Discussion forums. The following Figures illustrate an example of such an alternative embodiment, and also provide advantageous flexibility in both user interface and back-end configuration via parameters in the JavaScript and the HTML template as used in the disclosed system.

In addition, actions in FIGS. 3 and 4 described as being performed by or within the Client browser 12 may be performed within an XML feed control (e.g. Feed Widget 16), and/or elsewhere within the Parent HTML page 14.

Figure 5:
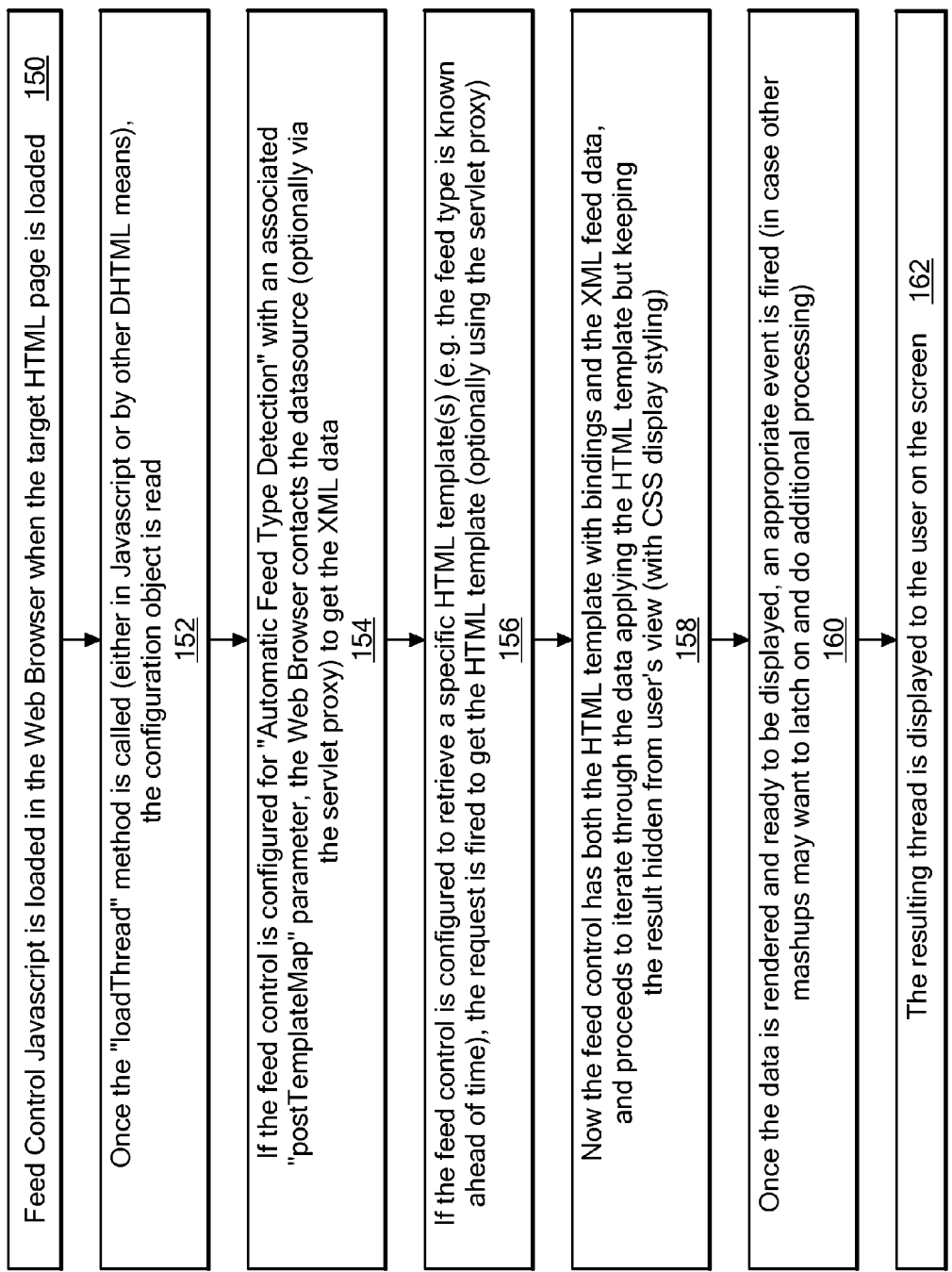
FIG. 5 is a flow chart showing steps performed during operation of the disclosed system.

FIG. 5 is a flow chart showing steps performed during operation of the disclosed system as embodied to provide an example of an XML feed consisting of a Comments/Discussion thread of entries. At step 150, the disclosed XML feed control Javascript is loaded into the Web browser when the Parent HTML page is loaded. For example, at step 150, a Comments/Discussion Widget analogous to the Feed Widget 16 of FIG. 1 may be loaded as part of a Parent HTML page into a Web browser such as the Client Browser 12 of FIG. 1 at step 150. At step 152, the "loadThread( )" method is called, either in Javascript or by other DHTML means, and the configuration object (e.g. FIG. 9) is read.

If the XML feed control loaded at step 150 is configured for automatic feed type detection (e.g. with an associated "post-TemplateMap" parameter shown in FIG. 9), then at step 154 the Web browser contacts an XML feed data source in a first asynchronous request to obtain the XML Comments/Discussion feed data. Further at step 154, once the feed data is loaded into the Web Browser, an event is fired to notify any other applications that the XML is now in the Web browser cache. The feed type is then determined, and a second asynchronous request is fired to retrieve the appropriate HTML template. Once the template loads, another event is fired to let other application know that the template also exists now in the Web Browser memory.

Alternatively, if the XML feed control loaded at step 150 is configured to retrieve one or more specific HTML templates, then at step 156 an HTTP request is fired to obtain the specified template(s). Further at step 156, once the template loads, an event is fired to inform other applications that the template is now loaded into the Web Browser. The XML feed control also reads the loaded template, and determines which XML Comments/Discussion feeds are necessary for the display by looking at the bindings. In one embodiment, the necessary fields for displaying the Comments/Discussion feeds are concatenated and encoded at the end of the target URL in order to let the server(s) know which are the relevant XML feeds for the current display. In an alternative, simpler embodiment, the XML feed control simply remembers these relevant fields and uses them later to optimize parsing in the following steps. A second asynchronous HTTP request is then fired to retrieve the XML feed data (for example via the Proxy Servlet 22 or the like), and once the feed data is downloaded into the Web browser, an event is fired to inform any interested applications that the feed data is now loaded into the Web Browser and available for them to use.

At step 158, the XML feed control has both the HTML template with bindings and the XML Comments/Discussion data, and proceeds to iterate through the data applying the HTML template to each entry, but keeping the result hidden from user's view (with CSS display styling). Another event is fired after each entry is processed so that any applications that have registered for the event can perform operations on each entry to add services and/or display objects to the entry before the entries are displayed. Once the complete set of entries in the XML data are rendered into a displayable format and ready to be displayed to the user, at step 160 the disclosed system fires another event so that other applications can be informed that the complete set of Comments/Discussion data is ready for display, so that such other applications can do additional processing to provide services or display objects prior to display of the feed data. At step 162 the resulting Comments/Discussion thread is displayed to the user.

Figure 6:
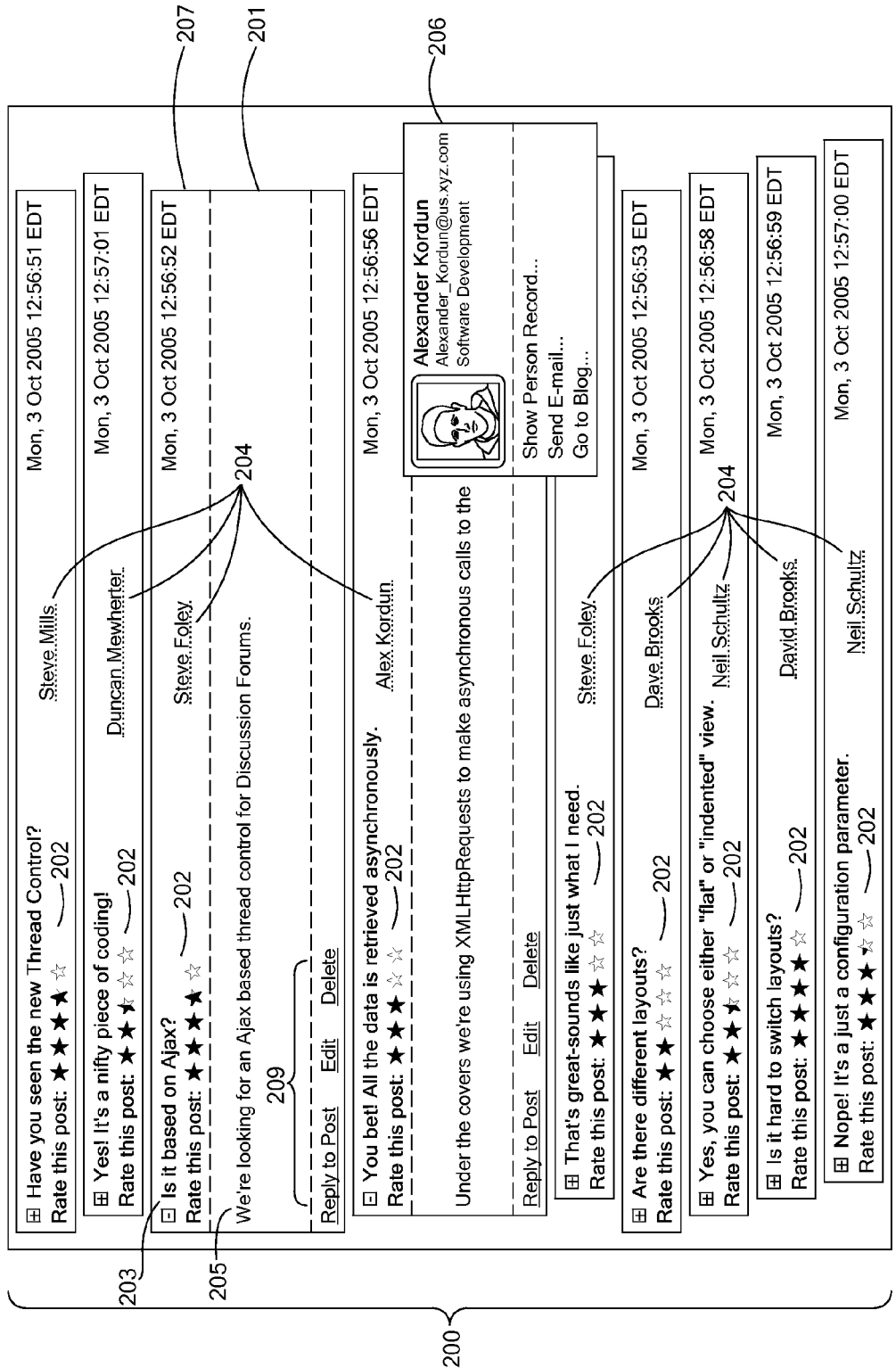
FIG. 6 is a simplified screen shot showing another example of a user interface provided by an illustrative embodiment of the disclosed system.

FIG. 6 is a simplified screen shot showing another example of a user interface provided by an illustrative embodiment of the disclosed system, as displayed by the embodiment of FIG. 5 at step 162. As shown in FIG. 6, a set of entries 200 has an indented layout on the Web page, for example as defined by a layout attribute in a configuration object (see FIG. 9). The XML feed for entries 200 coexists with a star-rating service that presents a star rating 202 within each entry, and that also enables users to click on the text "Rate this Post" and/or the adjacent entry star rating in order to enter their own entry rating. The star rating service is an example of the Other Services 21 shown in FIG. 1 that operates in response to one or more events that it registers for indicating specific points of completion by the XML feed control.

Each of the entries 200 further includes a link 204 to popup information 206 about corresponding entry authors, such as displayed in the box 206 generated in response to the user clicking on the name "Alex Kordun". Such personal information is provided, for example, by an inline personal information card application. The inline personal information card application is another example of the Other Services 21 shown in FIG. 1 that operates in response to one or more events that it registers for indicating specific points of completion by the XML feed control (e.g. a "Thread Loaded" event or the like).

In the example of FIG. 6, each of the entries 200 is a post in a discussion forum, each post for example including a title (e.g. title 203 for the post 201), a body (e.g. body 205 for the post 201), a posting date and time (e.g. date and time 207 for post 201), and a number of actions provided to the user (e.g. the reply to post, edit and delete actions 209 shown for post 201).

Figure 7:
FIG. 7 is a simplified screen shot showing still another example of a user interface provided by an illustrative embodiment of the disclosed system.

FIG. 7 is a simplified screen shot showing still another example of a user interface provided by an illustrative embodiment of the disclosed system, as alternatively displayed by the embodiment of FIG. 5 at step 162. In the example of FIG. 7, a set of entries 250 are displayed in a flat layout, for example as defined by a layout attribute within a configuration object (see FIG. 9). A text entry field 260 enables the local user to enter a comment to the feed data.

In the example of FIG. 7, each of the entries 250 is a comment in comments feed, each comment for example including a body (e.g. body 253 for comment 251), action buttons (e.g. action buttons 255 for comment 251), creation time and date (e.g. creation time and date 257 for comment 251), modification time and date (e.g. modification time and date 259 for comment 251), and an identifier and/or e-mail link to the posting user (e.g. e-mail link 261 for comment 251).

FIG. 8 shows a code segment 300 that is located within the Parent Web page that specifies 302 where the CSS is that is used for templates, and includes 304 a helper library ("roninHelper.js") for the XML feed control "ronin". The code segment 300 further includes 306 the main Javascript library "roninService.js", and defines 308 a container for the feed entries that includes a paging control for the displayed thread, and an entries section.

FIG. 9 shows configuration code 310 in an illustrative embodiment. The configuration code of FIG. 9 provides configuration of a single comment thread in a Web page, though the disclosed system also supports providing multiple threads within a Web page. As shown in FIG. 9, the code 310 defines 312 an XML feed source, defines 314 a paging size, defines 316 the name of an XML proxy server, defines 318 the name of the section of the Web page in which the XML feed is to be displayed, defines 320 the layout type (e.g. FLAT, as opposed to INDENTED), defines 322 which templates to use for which XML feed types in response to automatic feed-type detection, and defines 324 the function to be called to load and display the thread based on the XML feed data. While the "postTemplateMap:" of the example in FIG. 9 is shown providing automatic feed type detection for RSS and ATOM type feeds, the disclosed system is not limited to automatic detection and processing of those specific types of feeds. Accordingly, an embodiment of the disclosed system may be configured to identify and process any specific type of XML feed. For example, the Javascript method for feed identification (which may be considered part of a public API for the disclosed system) may be extended to check for certain elements contained in any custom defined schema, in order to identify the XML feed as being made up of that schema. Accordingly, the "postTemplateMap" of FIG. 9 could be specifically be extended to indicate a specific template for such a custom defined schema as needed for such an embodiment.

Since automatic feed type detection is supported in the example of FIG. 9, during operation, the XML feed data is downloaded first, then the feed type is determined, and then the appropriate template is chosen. However, the disclosed framework can be optionally configured to first download the chosen HTML template with bindings, and then download the XML feed itself. The main reason for this choice is that if the type of data that will be received is known a priori, the disclosed system can provide an advantageous parsing approach to the feed XML that obtains only the XML elements needed in specific display layout. This aspect of the disclosed system can dramatically reduce XML parsing time and may also reduce the amount of data to be transferred between the server(s) and the client.

Figure 10:
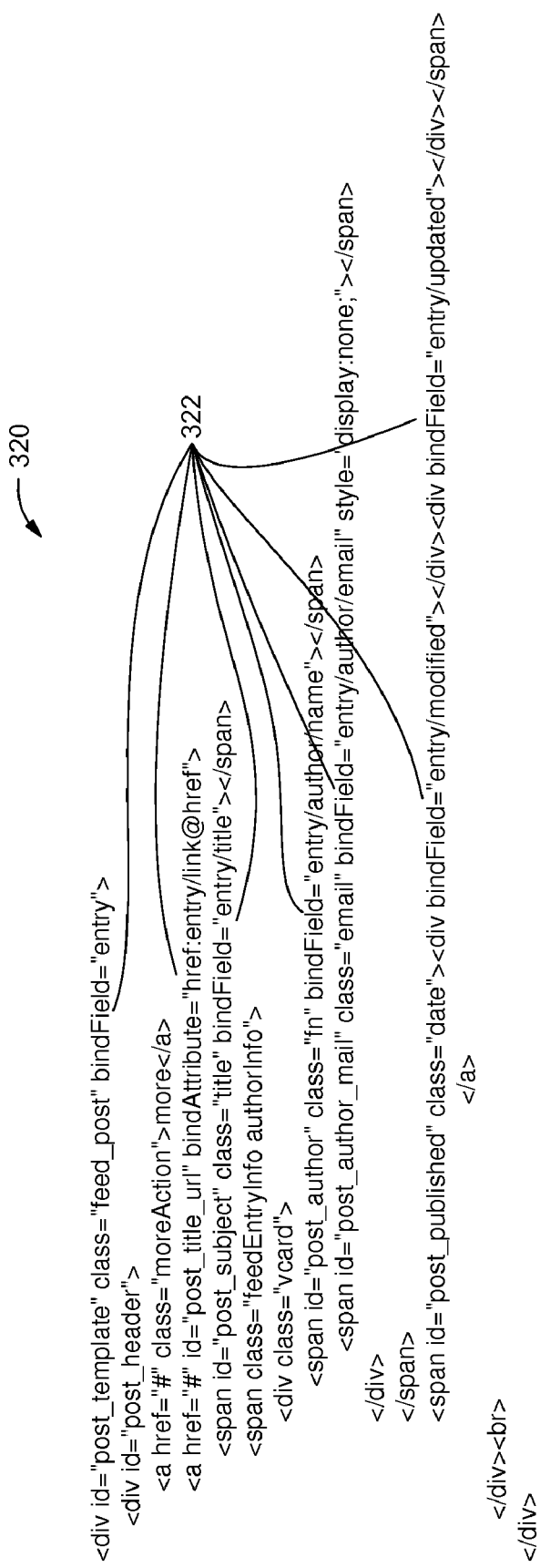
FIG. 10 is a code segment of an HTML template in an illustrative embodiment.

FIG. 10 is a code segment 320 showing an illustrative example of an HTML template (ATOMTextTemplate.jsp) in an illustrative embodiment of the disclosed system. As shown in FIG. 10, the I/O (Input/Output) bindings 322 tell the template where in the XML feed to retrieve the data via XPath (XML Path Language). In the disclosed system, both fields as well as attributes can be bound from XML to HTML without exposing the internal Javascript data-structures of our framework. Since the disclosed framework knows from such bindings which are the important elements in the feed, the remaining unimportant elements can be received but ignored (i.e. not parsed), thus saving frequent Javascript object creation that may slow down the entire rendering process.

In an alternative embodiment, when the HTTP request is issued to obtain the actual feed data, the XPaths of the bindField and bindAttribute elements 322 in FIG. 10 can be concatenated into a string and sent to the server(s) (e.g. Proxy Server 18 in FIG. 1). The server then operates such that only the specified elements are part of the feed data returned to the client system, thus significantly reducing network traffic by not sending the complete, all-inclusive feed XML. For example, the "entry/summary" element or the like may be part of the general XML feed data, but since it is not used in the current HTML template, it does not need to be parsed or transferred over the wire.

The disclosed system provides many significant advantages, including the flexibility resulting from not being tied to a particular XML format, such as ATOM or RSS. Accordingly, the template author is free to specify any XPath binding to take advantage of any XML formatted data coming over the wire.

Furthermore, those skilled in the art will recognize that the disclosed templates, while being regular HTML, may have jsp extensions, and may accordingly themselves be implemented as JSP/servlets on the server, taking advantage of powerful server-side scripting/logic. All the disclosed system requires is that it receives valid HTML to apply to feed data XML. This has the significant advantage of using regular HTML, and does not involve a complex syntax for binding and templatability. The disclosed system is also much easier to maintain and modify for different XML types as well as for appearance and format changes.

While the above description regarding illustrative embodiments of the disclosed system includes examples of specific user interface display objects, such as graphical buttons, menus, dialog boxes, and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for providing a feed control in a parent Web page, comprising:
   determining a data feed to be displayed to a local user, said data feed made up of a plurality of entries;
   determining a template defining a format and appearance of one of said entries in said data feed;
   loading said template from a template source;
   loading said data feed onto a local device from a data feed source, wherein said loading includes retrieving data bindings from said template and using said data bindings retrieved from said template to indicate to a remote data server providing said data feed which data is relevant to displaying said data feed according to said template by encoding said data bindings retrieved from said template onto a link associated with said data feed in at least one request message sent to said remote data server providing said data feed, intercepting, by an agent on said remote server system, said at least one request, and, responsive to said data bindings encoded onto said link, sending at least one response from said remote server system to said local device, wherein said response includes only data specified by said data bindings encoded onto said link;
   applying said template to each of said plurality of entries; and
   displaying said plurality of entries to said local user.

2. The method of claim 1, wherein said data feed comprises an XML data feed.

3. The method of claim 2, wherein said data feed comprises a Web news feed and said plurality of entries are made up of news entries, each of said news entries including a summary and a link to a corresponding complete article.

4. The method of claim 2, wherein said data feed comprises a discussion thread and said plurality of entries are made up of comment entries, each of said comment entries including a comment body and an identifier of a comment author.

5. The method of claim 1, further comprising:
   firing an entry formatted event to at least one service other than said data feed, and wherein said at least one service other than said data feed adds at least one display object to each of said entries; and
   wherein said entry formatted event is fired followed after each of said entries is formatted based on said template.

6. The method of claim 5, wherein said at least one other service comprises a star rating service.

7. The method of claim 5, wherein said at least one other service comprises an inline personal information card.

8. The method of claim 5, further comprising firing a template received event to said at least one service other than said data feed upon receipt of said template by said local device.

9. The method of claim 8, further comprising firing a feed data received event to said at least one service other than said data feed upon receipt of said feed data from said feed data source.

10. The method of claim 9, further comprising firing a feed data ready for display event to said at least one service other than said data feed upon completion of formatting all of said entries of said data feeds.

11. The method of claim 1, further comprising:
   determining an identifier of said template based on an automatically determined type of said data feed.

12. The method of claim 11, wherein said automatically determined type of said data feed is RSS.

13. The method of claim 11, wherein said automatically determined type of said data feed is ATOM.

14. The method of claim 1, wherein said local device comprises a local computer.

15. The method of claim 1, further comprising enabling said local user to post data back to said data feed source.

16. The method of claim 1, wherein said template is made up of HTML.

17. An apparatus including a computer readable memory, said computer readable memory having program code stored thereon operable when executed to cause a computer system to provide a feed control in a parent Web page to a local user by:
   determining a data feed to be displayed to a local user, said data feed made up of a plurality of entries;
   determining a template defining a format and appearance of one of said entries in said data feed;
   loading said template from a template source;
   loading said data feed onto a local computer system from a data feed source, wherein said loading includes retrieving data bindings from said template and using said data bindings retrieved from said template to indicate to a remote data server providing said data feed which data is relevant to displaying said data feed according to said template by encoding said data bindings retrieved from said template onto a link associated with said data feed in at least one request message sent to said remote data server providing said data feed, intercepting, by an agent on said remote server system, said at least one request, and, responsive to said data bindings encoded onto said link, sending at least one response from said remote server system to said local computer system, wherein said response includes only data specified by said data bindings encoded onto said link;
   applying said template to each of said plurality of entries; and
   displaying said plurality of entries to said local user.

18. A computer program product including a computer readable memory, said computer readable memory having program code thereon operable when executed to cause a computer system to provide a feed control in a parent Web page to a local user by:
   determining a data feed to be displayed to a local user, said data feed made up of a plurality of entries;
   determining a template defining a format and appearance of one of said entries in said data feed;
   loading said template from a template source;
   loading said data feed onto a local computer system from a data feed source, wherein said loading includes retrieving data bindings from said template and using said data bindings retrieved from said template to indicate to a remote data server providing said data feed which data is relevant to displaying said data feed according to said template by encoding said data bindings retrieved from said template onto a link associated with said data feed in at least one request message sent to said remote data server providing said data feed, intercepting, by an agent on said remote server system, said at least one request, and, responsive to said data bindings encoded onto said link, sending at least one response from said remote server system to said local computer system, wherein said response includes only data specified by said data bindings encoded onto said link;
   applying said template to each of said plurality of entries; and
   displaying said plurality of entries to said local user.

* * * * *